United States Patent
Takeuchi

(10) Patent No.: US 7,480,989 B2
(45) Date of Patent: Jan. 27, 2009

(54) METHOD FOR MANUFACTURING PRESSURE DETECTOR

(75) Inventor: Hisayuki Takeuchi, Kariya (JP)

(73) Assignee: DENSO CORPORATION, Kariya-city (JP)

( * ) Notice: Subject to any disclaimer, the term of this patent is extended or adjusted under 35 U.S.C. 154(b) by 327 days.

(21) Appl. No.: 11/311,542

(22) Filed: Dec. 20, 2005

(65) Prior Publication Data
US 2006/0162141 A1 Jul. 27, 2006

(30) Foreign Application Priority Data
Jan. 25, 2005 (JP) .............................. 2005-017053

(51) Int. Cl.
*H05K 3/34* (2006.01)
(52) U.S. Cl. .................... 29/840; 29/830; 29/407.08; 29/593; 73/715
(58) Field of Classification Search .................. 29/593, 29/594, 830, 407.01, 407.08, 25.35, 595, 29/832, 840; 73/1.35, 35.12, 115, 715, 723–727; 310/324, 338; 438/51, 53
See application file for complete search history.

(56) References Cited

U.S. PATENT DOCUMENTS

| | | | | |
|---|---|---|---|---|
| 4,567,395 A | * | 1/1986 | Pundarika | 73/715 |
| 5,315,875 A | * | 5/1994 | Benedikt et al. | 73/727 |
| 5,537,883 A | * | 7/1996 | Okauchi et al. | 29/25.35 |
| 5,583,295 A | * | 12/1996 | Nagase et al. | 73/115 |
| 6,883,219 B2 | | 4/2005 | Kuroda et al. | |

FOREIGN PATENT DOCUMENTS

JP   A-2004-286617   10/2004

* cited by examiner

*Primary Examiner*—Donghai D. Nguyen
(74) *Attorney, Agent, or Firm*—Posz Law Group, PLC

(57) ABSTRACT

A method for manufacturing a pressure detector includes the steps of: preparing a first member including a sensing portion, a second member including a pressure receiving diaphragm, and a pressure transmission member; inserting the pressure transmission member between the sensing portion and the pressure receiving diaphragm; applying a preliminary load to the sensing portion; connecting the first member and the second member under the preliminary load; monitoring a signal from the sensing portion, corresponding to the preliminary load; and determining the preliminary load on the basis of the electric signal monitored in the step of monitoring.

8 Claims, 5 Drawing Sheets

METHOD FOR MANUFACTURING PRESSURE DETECTOR

CROSS REFERENCE TO RELATED APPLICATION

This application is based on Japanese Patent Application No. 2005-17053 filed on Jan. 25, 2005, the disclosure of which is incorporated herein by reference.

FIELD OF THE INVENTION

The present invention relates to a method for manufacturing a pressure detector.

BACKGROUND OF THE INVENTION

Conventionally, a pressure detector includes a first member having a sensing portion, a second member having a diaphragm for receiving pressure and a pressure transmission member. The sensing portion detects the pressure and outputs an electric signal corresponding to the applied pressure. The diaphragm receives the applied pressure. The pressure transmission member transmits the pressure received by the diaphragm to the sensing portion.

In the conventional detector, the sensing portion, the pressure transmission member and the diaphragm are provided by different parts. These three parts contact together so as to sandwich the pressure transmission member between the sensing portion and the diaphragm. Thus, excess load is applied to these three parts.

In the detector, the pressure received by the diaphragm is transmitted to the sensing portion through the pressure transmission member. The sensing portion outputs the electric signal in accordance with the applied and transmitted pressure. Thus, the detector detects the pressure.

This detector is manufactured as follows.

The pressure transmission member is inserted between the sensing portion and the diaphragm. Then, a preliminary load is applied to the sensing portion through the diaphragm and the pressure transmission member.

In this case, the preliminary load is applied to the diaphragm with load application equipment through a jig. Thus, the diaphragm is pressed by a predetermined amount. Under this condition, the first member and the second member are welded. Thus, the pressure detector is manufactured.

However, in a conventional method for manufacturing the pressure detector, the preliminary load is determined on the basis of a measurement value obtained by mechanically measuring the load applied with load application equipment through the jig. This determination step of the preliminary load mechanically measured is a step of measuring a pressing force through the jig. Therefore, the measured preliminary load may have measurement error, compared with the actual preliminary load. This error may be caused by tolerance of parts, tolerance of assembly or deviation of contact condition of the pressure transmission member. Thus, there is a possibility to cause big deviation between the measured preliminary load and the actual preliminary load.

This deviation causes measurement error of the pressure detector, since the preliminary load to the detection element and the pressure receiving diaphragm are deviated largely.

SUMMARY OF THE INVENTION

In view of the above-described problem, it is an object of the present invention to provide a method for manufacturing a pressure detector with high measurement accuracy.

A method for manufacturing a pressure detector includes the steps of: preparing a first member including a sensing portion for outputting an electric signal corresponding to a pressure; preparing a second member including a pressure receiving diaphragm; preparing a pressure transmission member for transmitting the pressure received by the pressure receiving diaphragm to the sensing portion; inserting the pressure transmission member between the sensing portion and the pressure receiving diaphragm; applying a preliminary load to the sensing portion through the pressure transmission member from the pressure receiving diaphragm; connecting the first member and the second member under the preliminary load; monitoring the electric signal outputted from the sensing portion, the electric signal corresponding to the preliminary load applied to the sensing portion; and determining the preliminary load on the basis of the electric signal monitored in the step of monitoring.

In the above method, when the first and the second member are connected, the preliminary load applied to the sensing portion from the pressure receiving diaphragm is determined on the basis of the electric signal outputted from the sensing portion. Thus, the preliminary load actually applied to the sensing portion is determined, so that the preliminary load is accurately determined, compared with a conventional method. Thus, the method provides the pressure detector having high measurement accuracy.

Alternatively, the method may further include the step of: preliminary welding the first member and the second member under the preliminary load. In the step of connecting, the first member and the second member are completely welded after the step of preliminary welding. Alternatively, in the step of preliminary welding, the first member and the second member are welded at a plurality of overlapped portions between the first member and the second member, and, in the step of connecting, the first member and the second member are welded all around.

Alternatively, in the step of allying the preliminary load, the preliminary load is applied with load application equipment, and, in the step of monitoring the electric signal, the electric signal corresponding to the preliminary load applied with the load application equipment is inputted into the load application equipment so that the preliminary load is controlled with a feedback control method. Alternatively, the step of connecting the first member and the second member is performed under the preliminary load, which is controlled with the feedback control method, and, in the step of connecting, the first member and the second member are welded all around by a laser beam welding method, a resistance welding method or a plasma welding method.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 5:
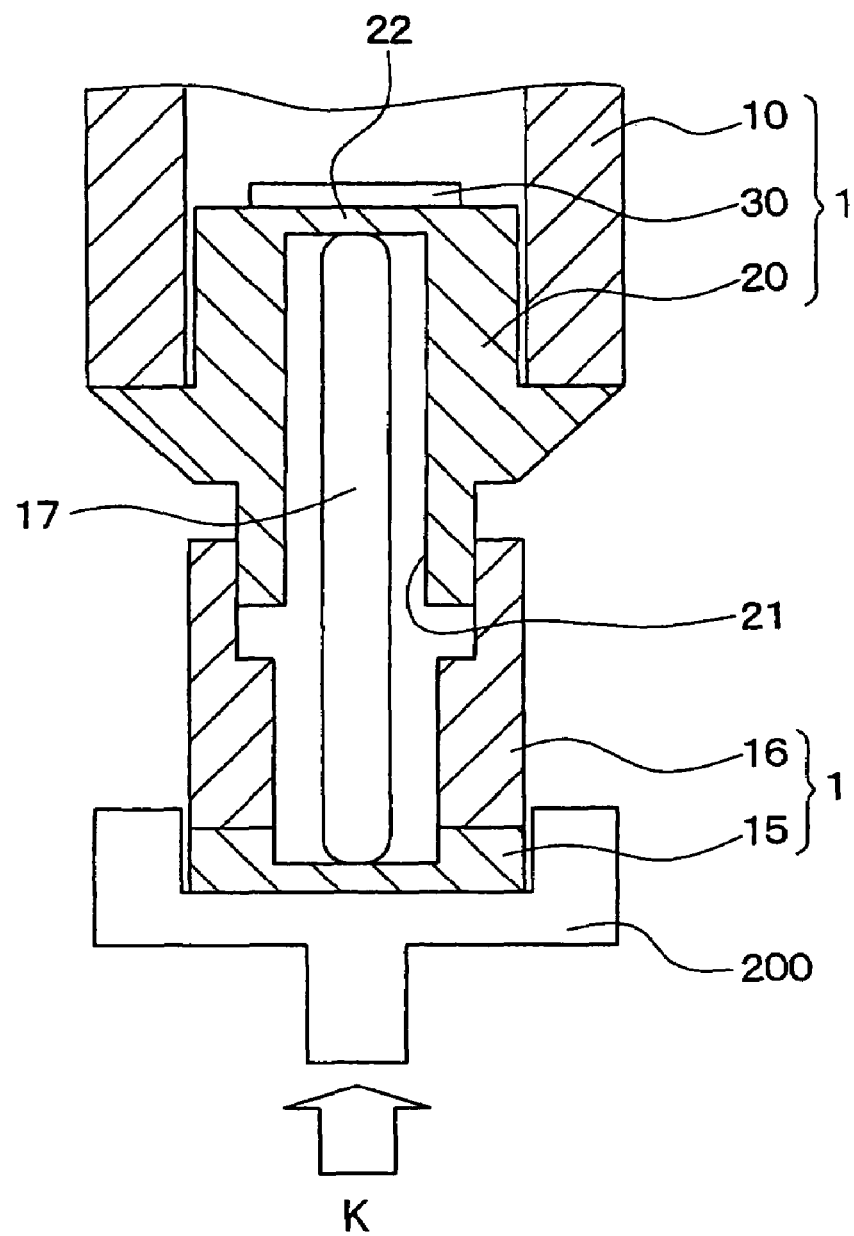
FIG. 5 is a partially enlarged cross sectional view showing a pressure detector as a comparison of the preferred embodiment.

FIG. 5 shows an example of a pressure detector J100 as a comparison of a preferred embodiment of the present invention. This detector J100 can be used for detecting combustion pressure, for example. The detector J100 includes a housing 10 having a detection element 30 as a sensing portion. The detection element 30 outputs an electric signal in accordance with applied pressure. The detection element 30 is formed of, for example, a semiconductor chip. Therefore, the applied pressure may deform the detection element 30 itself. On the basis of strain of the element 30, the element 30 outputs the signal corresponding to the pressure so that the element 30 works as a strain gauge.

The element 30 is mounted on a metallic stem 20 by using a glass welding method. Specifically, the element 30 is mounted on a surface of the metallic stem 20, the surface being disposed outside of a diaphragm 22 as a pressure detecting diaphragm. The metallic stem 20 includes an opening 21 disposed on one end thereof, and the diaphragm 22 disposed on the other end thereof. The other end of the metallic stem 20 is closed and sealed so that the thin diaphragm 22 is provided. Thus, the metallic stem 20 has a hollow cylindrical shape.

The metallic stem 20 is fixed to the housing 10 in such a manner that the diaphragm 22 of the metallic stem 20 faces the housing 10. The metallic stem 20 and the housing 10 are bonded together by using a welding method or a bonding method. The opening 21 of the metallic stem 20 is connected to a metallic casing 16 having a cylindrical shape by the welding method. Thus, one end of the metallic casing 16 is fixed to the opening 21 of the metallic stem 20. Further, the other end of the metallic casing 16 is connected to a diaphragm 15 as a pressure receiving diaphragm. The diaphragm 15 for receiving the applied pressure is made of metallic material, and has a circular shape. Here, the metallic casing 16 and the diaphragm 15 are bonded together by using the welding method or the like. Thus, the diaphragm 15 and the metallic stem 20 are integrated through the metallic casing 16. The diaphragm 15 is deformable when a pressure such as a combustion pressure is applied to the diaphragm 15. The diaphragm faces, for example, a combustion chamber for receiving the combustion pressure.

The metallic stem 20 has a hollow portion so that the one end of the metallic stem 20 is opened, and the other end of the metallic stem 20 is closed. The metallic casing 16 has also a hollow portion. A pressure transmission member 17 is disposed in the hollow portions of the metallic stem 20 and the metallic casing 16. The pressure transmission member 17 is made of, for example, metallic material or ceramics. Thus, the pressure transmission member 17 is disposed between the pressure receiving diaphragm 15 and the pressure detecting diaphragm 22 of the metallic stem 20.

In FIG. 5, an arrow represents a load applied to the diaphragm 22 of the metallic stem 20. Thus, the one end of the pressure transmission member 17 contacts the pressure detecting diaphragm 22 in such a manner that the load K is applied to the diaphragm 22. Further, the other end of the pressure transmission member 17 contacts the pressure receiving diaphragm 15 in such a manner that the load K is applied to the diaphragm 15. Specifically, the applied pressure is applied to the detection element 30 through the pressure receiving diaphragm 15, the pressure transmission member 17 and the pressure detecting diaphragm 22. In the detector J100, the detection element 30, the metallic stem 20 and the housing 10 connecting to the stem 20 provide the first member 1 having a sensing portion.

The pressure receiving diaphragm 15 and the metallic casing 16 integrated with the diaphragm 15 provide the second member 2 having the pressure receiving diaphragm.

In the detector J100, the pressure transmission member 17 is disposed between the detection element 30 and the diaphragm 15. Further, a certain load is applied to the detection element 30 through the diaphragm 15 and the pressure transmission member 17. Under this load, the first member 1 and the second member 2 are welded.

This detector J100 is manufactured as follows.

The first member 1 composing the detection element 30, the metallic stem 20 and the housing 10, which are integrated together, is prepared. The second member 2 composing the pressure receiving diaphragm 15 and the metallic casing 16, which are integrated together, is also prepared. Further, the pressure transmission member 17 is prepared.

The pressure transmission member 17 is inserted between the detection element 30 as the sensing portion and the pressure receiving diaphragm 15. Then, a preliminary load is applied to the detection element 30 through the pressure receiving diaphragm 15 and the pressure transmission member 17.

In this case, the preliminary load is applied to the pressure receiving diaphragm 15 with load application equipment (not shown) through a jig 200 in a direction shown as K in FIG. 5. The load application equipment can control the load. Thus, the pressure receiving diaphragm 15 is pressed by a predetermined amount. Under this condition, the first member 1 and the second member 2 are welded. Specifically, under the condition of applying the preliminary load to the pressure receiving diaphragm 15, the opening side of the metallic stem and the metallic casing 16 of the second member 2 are welded. Thus, the pressure detector J100 is manufactured.

However, the preliminary load is determined on the basis of a measurement value obtained by mechanically measuring the load applied with load application equipment through a jig 200. Therefore, the measured preliminary load may have measurement error, compared with the actual preliminary load. Thus, there is a possibility to cause big deviation between the measured preliminary load and the actual preliminary load. Accordingly, the deviation causes measurement error of the pressure detector, since the preliminary load to the detection element 30 and the pressure receiving diaphragm 15 are deviated largely.

Figure 1:
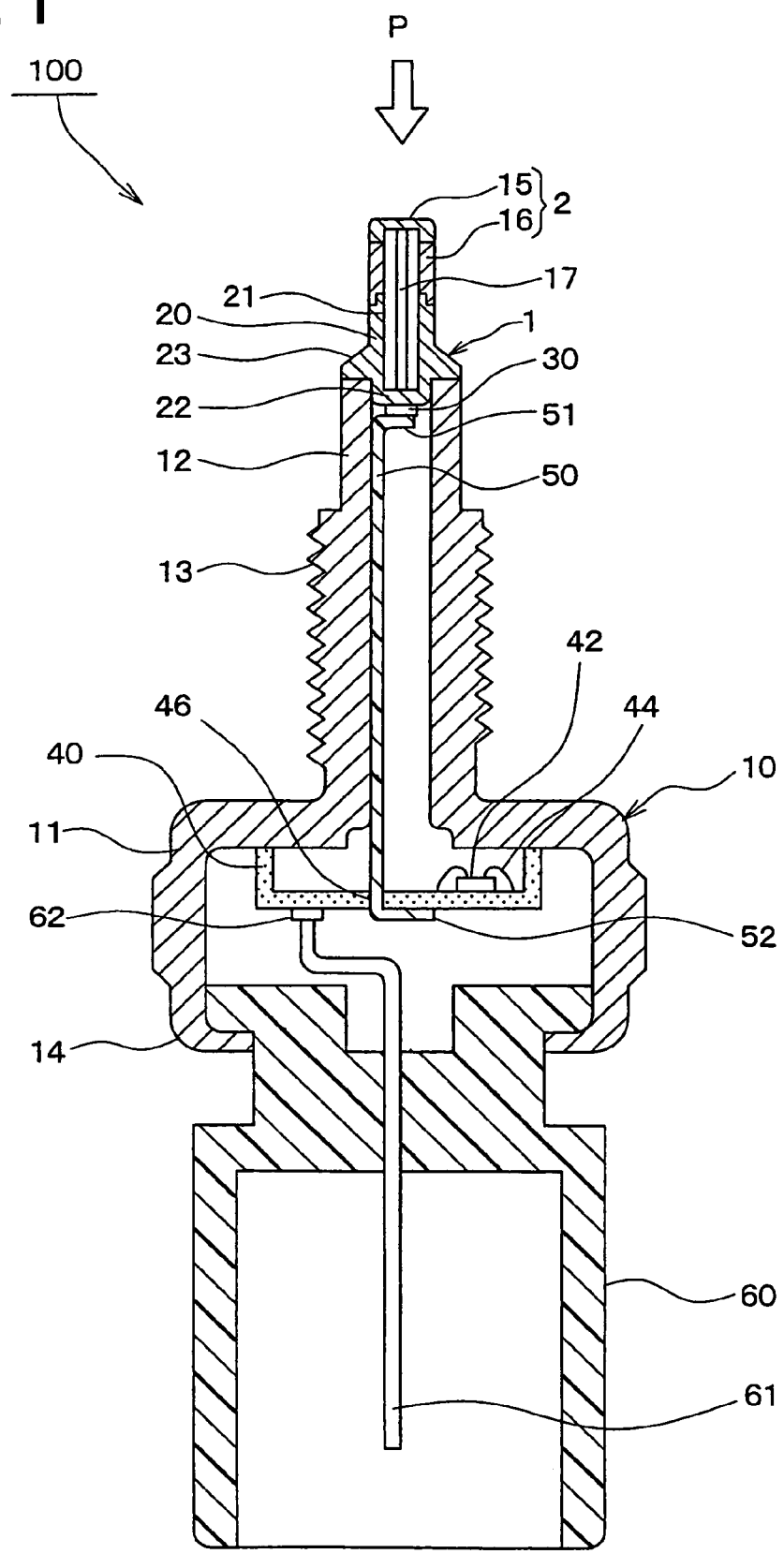
FIG. 1 is a schematic cross sectional view showing a pressure detector according to a preferred embodiment of the present invention.
Figure 2:
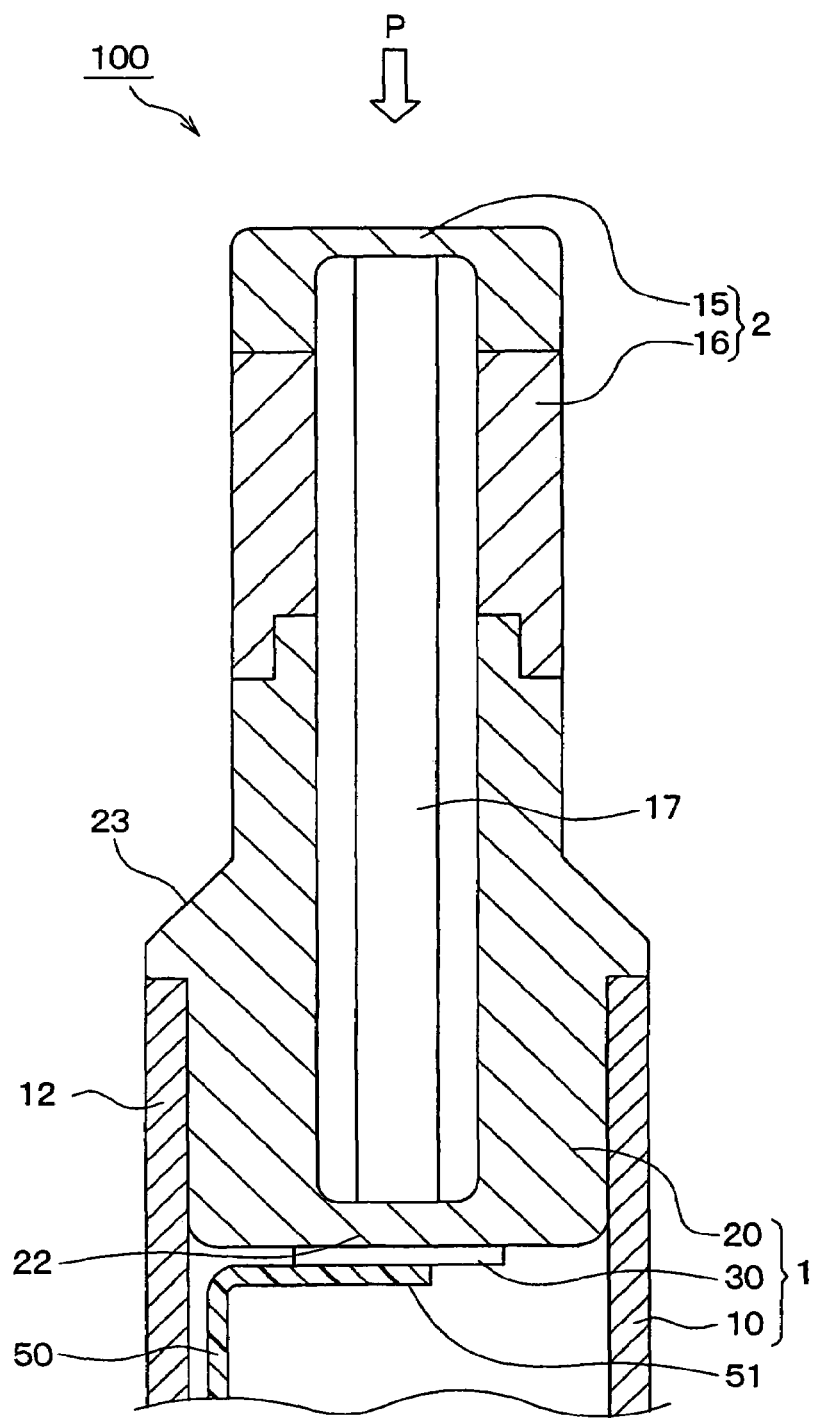
FIG. 2 is a partially enlarged cross sectional view showing a top of a pipe portion in the detector according to the preferred embodiment.

In view of the above points, a pressure detector 100 according to this embodiment is manufactured. FIG. 1 shows the detector 100, and FIG. 2 shows a top of a pipe portion 12 in a housing 10. The detector is used for, for example, a combustion pressure sensor or the like. Here, the combustion pressure sensor detects a combustion pressure in a combustion chamber of an automotive vehicle. The combustion pressure is a cylinder inner pressure of the combustion chamber of an engine. The combustion pressure sensor is inserted into an attachment hole of an engine head of the engine with a screw. Specifically, the pipe portion 12 of the housing 10 is inserted into the attachment hole.

The housing 10 of the detector 100 includes a main body 11 having a cylindrical shape and the pipe portion 12 having an elongated cylindrical shape. The pipe portion 12 is thinner than the main body 11. The main body 11 and the pipe portion 12 are made of stainless steel, and formed by a cutting method, a cold forging method or the like. Although the pipe portion 12 has a cylindrical pipe shape, the pipe portion 12 may have a rectangular pipe shape or the like.

In the housing 10, the main body 11 and the pipe portion 12 may be integrally formed together, or they are connected after they are formed individually. The connection between the main body 11 and the pipe portion 12 is performed by a welding method, a bonding method with adhesive, a press-inserting method, a screw cramp method, or a crimping method.

A screw portion 13 is formed on an outer periphery of the pipe portion 12 for connecting an engine block or the like as an object to be measured. The pipe portion 12 protrudes from one end of the housing 10. The pipe portion 12 of the housing 10 is inserted into an attachment hole as a screw hole of the engine block so that the screw portion 13 is screwed to the attachment hole. Thus, the detector 100 is mounted on the engine block.

When the detector 100 is mounted on the engine block, the combustion pressure P as a pressure to be detected is applied to the top of the pipe portion 12 in a direction along with an arrow in FIG. 1. The detection element 30 for outputting an electric signal corresponding to the detected pressure is formed on the top of the pipe portion 12. The detection element 30 is deformed itself by the applied pressure, and the detection element 30 as a strain gauge outputs the signal on the basis of the strain of the element 30.

As shown in FIGS. 1 and 2, the detection element 30 is mounted on an outer surface of a diaphragm 22 of a metallic stem 20 by a glass welding method and the like. The diaphragm 22 as a pressure detecting diaphragm is a strain portion as a thin portion. One end of the diaphragm 22 is an opening 21, and the other end of the diaphragm 22 is closed by the diaphragm 22. The metallic stem 20 has a cylindrical hollow portion.

The metallic stem 20 is made of metal. A flange 23 is formed on the outside of the metallic stem 20. The flange 23 protrudes in a direction perpendicular to a cross section of the stem 20. Although the hollow portion of the stem 20 has a cylindrical shape, the hollow portion of the stem 20 may have a rectangular shape.

The metallic stem 20 is inserted into the pipe portion 12 in such a manner that the diaphragm 22 of the stem 20 faces the inside of the pipe portion 12, and the opening 21 of the stem 20 faces the combustion chamber side. The flange 23 of the stem 20 and the top of the pipe portion 12 are connected by a welding method, a bonding method or the like. The outer surface of the flange 23 of the stem 20 is tapered from the opening 21 to the diaphragm 22. Therefore, the diameter of the flange 23 gradually increases toward the outside. When the detector 100 is connected to the engine head through the screw portion 13, the tapered surface, i.e., the outer surface of the flange 23 and an inner surface of the attachment hole of the engine head are sealed and tightly connected.

Further, the opening 21 of the stem 20 is connected to the metallic casing 16 by a welding method or the like. The metallic casing 16 is made of metal such as stainless steel, and has a cylindrical shape. It is preferred that the metallic stem 20 and the metallic casing 16 are welded all around by a laser beam welding method, a resistance welding method or a plasma welding method.

A pressure receiving diaphragm 15 is formed on the top of the metallic casing 16. The pressure receiving diaphragm 15 receives the applied pressure. The opening 21 of the stem 20 is closed with the pressure receiving diaphragm 15 through the metallic casing 16. The diaphragm 15 is made of, for example, metal, and has a disk shape. The diaphragm 15 is bonded to the top of the metallic casing 16 by a welding method or a brazing method.

The pressure receiving diaphragm 15 and the metallic stem 20 are integrated through the metallic casing 16. The pressure receiving diaphragm 15 faces the combustion chamber so that the diaphragm 15 receives the combustion pressure P in the direction of the arrow in FIG. 1. Thus, the pressure receiving diaphragm 15 is deformed.

A pressure transmission member 17 is accommodated in the inside of the hollow portion of the metallic stem 20 and the metallic casing 16. The pressure transmission member 17 has a rod shape. Thus, the pressure transmission member 17 is disposed between the pressure receiving diaphragm 15 and the pressure detecting diaphragm 22 as a pressure sensing portion. The pressure transmission member 17 is made of, for example, metal such as stainless steel or ceramics.

The one end, i.e., the top end of the pressure transmission member 17 contacts the pressure receiving diaphragm 15 in such a manner that a load is applied to the diaphragm 15, and the other end of the pressure transmission member 17 contacts the pressure detecting diaphragm 22 in such a manner that a load is applied to the diaphragm 22.

Although the pressure transmission member 17 is a rod, the pressure transmission member 17 may be a sphere, an oblate sphere, or a dram. The applied pressure P is applied to the detection element 30 through the pressure receiving diaphragm 15, the pressure transmission member 17 and the pressure detecting diaphragm 22.

The detection element 30 having a strain gauge function is formed such that, for example, a bridge circuit having a diffusion resistance device is formed in a silicon semiconductor chip by a semiconductor process. In this case, the semiconductor chip having the strain gauge function is deformed in accordance with a deformation of the diaphragm 22 when the pressure P is applied to the diaphragm 22. The deformation, i.e., the strain of the chip causes a resistance change of the chip, and then, the chip converts the resistance change to the electric signal. Then, the chip outputs the signal corresponding to the detected pressure.

The detection element 30 as the sensing portion outputs the electric signal in accordance with the applied pressure P. The detection element 30 and the diaphragm 22 of the metallic stem 20 provide a strain portion deformable by the pressure P. Thus, the diaphragm 22 and the detection element 30 are main parts of the detector 100 for determining basic characteristics of the detector 100.

It is required for the metallic material composing the metallic stem 20 to have low thermal expansion coefficient, since the detection element 30 is bonded to the stem through a low melting point glass or the like. Further, it is required for the metallic material of the metallic stem 20 to have high strength, since the stem is applied with high pressure. Specifically, major constituents of the stem 20 are Fe, Ni and Co or Fe and Ni. Ti, Nb and Al or Ti and Nb as a deposition enhancement material are added in the major constituents. For example, the stem 20 is made of deposition enhancement type stainless steel. The stem 20 is formed by a press method, a cutting method or a cold forging method.

In the detector 100, the detection element 30, the stem 20 and the housing 10 provide the first member 1 including a sensing portion for outputting the electric signal corresponding to the applied pressure. The pressure receiving diaphragm 15 and the metallic casing 16 provide the second member 2 including a pressure receiving portion.

In the detector 100, the pressure transmission member 17 is disposed between the detection element 30 and the pressure receiving diaphragm 15. Under the condition where a predetermined load is applied to the detection element 30 through the pressure transmission member from the pressure receiving diaphragm 15, the first member 1 and the second member 2 are welded.

A circuit board 40 made of ceramics or the like is formed in the main body 11 of the housing 10. The circuit board 40 is formed at a boundary between the main body 11 and the pipe portion 12 to cover the opening of the pipe portion 12. The periphery of the circuit board 40 is fixed to the housing 10 by a bonding method or the like.

An IC chip 42 is mounted on one side of the circuit board 40 by a bonding method or the like, the one side facing the opening of the pipe portion 12. The IC chip 42 controls and magnifies the output from the detection element 30.

The IC chip 42 and the circuit board 40 are electrically connected with a bonding wire 44 made of aluminum, gold or the like. The circuit board 40 and the detection element 30 are also connected with a wiring member 50 electrically.

The wiring member 50 is formed of, for example, a flexible printed circuit board (i.e., FPC). Alternatively, the wiring member 50 may be a lead wire or the like.

The flexible printed circuit board 50 is made of a polyimide resin base, and includes a conductive pattern made of copper or the like. The flexible printed circuit board 50 is disposed to extend in a longitudinal direction of the pipe portion 12, and disposed in the pipe portion 12 of the housing 10.

The flexible printed circuit board 50 includes one end 51 connecting to the detection element 30 with solder electrically and mechanically. Specifically, a conductive portion on the flexible printed circuit board 50 is connected to a pad formed on the surface of the detection element 30.

Thus, the one end of the board 50 provides a connection portion between the flexible printed circuit board and the detection element 30. The board 50 is bended at the one end of the board 50. The bended portion of the board 50 from the one end extends toward the other end 52 of the board 50. Specifically, the bended portion of the board 50 extends in the pipe portion 12 toward the circuit board 40.

The other end 52 of the board 50 is disposed on the main body side. Specifically, the other end 52 of the board 50 is disposed on the other side of the circuit board 40, which is opposite to the IC chip 42. The flexible printed circuit board 50 penetrates the circuit board 40 through a through hole 46. The other end 52 of the board 50 is electrically connected to the circuit board 40 with solder or the like. The other end 52 of the board 50 is connected to the other side of the circuit board 40, which is opposite to the IC chip 42.

A connector casing 60 including a terminal 61 is formed on the housing 10. The connector casing 60 faces the other end 52 of the flexible printed circuit board 50. Specifically, the connector casing 60 faces the connection portion between the flexible printed circuit board 50 and the circuit board 40 in the housing 10.

The connector casing 60 is made of resin such as PPS (i.e., poly-phenylene sulfide). The terminal 61 is integrally insert-molded in the connector casing 60. The connector casing 60 provides a connector portion for retrieving the signal from the detection element 60. The terminal 61 and the circuit board 40 are electrically connected through a spring portion 62 so that the terminal 61 contacts the circuit board 40 with a spring contact. Thus, the detection element 30 and the connector casing 60 are electrically connected through the flexible printed circuit board 50 and the circuit board 40.

An end 14 of the main body 11 in the housing 10 is crimped to the connector casing 60 so that the connector casing is fixed to the housing 10 integrally. The terminal 61 is connectable to an ECU or the like of an automotive vehicle through a wiring and the like. Thus, the detector 100 can communicate to an external circuit.

The detector 100 is connected and fixed to a screw hole, i.e., an attachment hole, of the engine head of the vehicle through the screw portion 13 of the housing 10. The combustion pressure P is applied to the pressure receiving diaphragm 15. Then, the pressure P transmits to the pressure detecting diaphragm 22 through the pressure transmission member 17. Then, the diaphragm 22 is deformed so that the detection element 30 detects the deformation of the diaphragm 22. Thus, the detection element 30 converts the deformation to the electric signal so that the applied pressure is detected. Then, the signal from the detection element 30 is outputted to the circuit board 40 through the flexible printed circuit board 50. The signal is processed in the IC chip 42, and the processed signal is outputted through the terminal 61.

A method for manufacturing the detector 100 is explained as follows. Firstly, the first member 1 having a sensing portion, the second member 2 having the pressure receiving diaphragm 15, and the pressure transmission member 17 are prepared. Specifically, the detection element 30 is bonded to the surface of the diaphragm 22 of the metallic stem 20. The one end 51 of the flexible printed circuit board 50 is bonded to the detection element 30 through solder.

Next, the other end 52 of the flexible printed circuit board 50 is inserted into the housing 10 from the top of the pipe portion 12. Then, the other end 52 of the flexible printed circuit board 50 is drawn inside of the main body 11. The stem 20 and the pipe portion 12 are connected.

Then, the other end 52 of the flexible printed circuit board 50 is passed through the through hole 46 of the circuit board 40. Here, the IC chip 42 is mounted on the circuit board 40 with a bonding wire. Then, the other end 52 of the flexible printed circuit board 50 and the circuit board 40 are bonded with solder.

Next, the circuit board 40 is bonded to the main body 11 of the housing 10. The connector casing 60 is assembled to the main body 11, and the end 14 of the housing 10 is crimped so that the connector casing 60 and the housing 10 are fixed. Here, when the connector casing 60 is assembled to the housing 10, the terminal 61 and the circuit board 40 contacts together with a spring contact through the spring portion 62 so that the terminal 61 is electrically connected to the circuit board 40. Thus, the first member 1 having the detection element 30, the metallic stem 20 and the housing 10, which are integrated, is formed.

The metallic casing 16 and the pressure receiving diaphragm 15 are bonded by a brazing method, the welding method or the like. Thus, the metallic casing 16 and the pressure receiving diaphragm 15 are integrated so that the second member 2 is formed.

Next, the pressure transmission member 17 is inserted between the detection element 30 and the pressure receiving diaphragm 15. Then, a predetermined load as a preliminary load is applied to the detection element 30 through the pressure receiving diaphragm 15, the pressure transmission member 17 and the pressure detecting diaphragm 22 of the metallic stem 20. Under this load, the first member 1 and the second member 2 are welded.

Here, the first member 1 and the second member 2 are welded under the preliminary load, as shown in FIGS. 1 and 2. Specifically, the opening 11 of the stem 20 in the first member 1 and the metallic casing 16 in the second member 2 are welded. Thus, the detector 100 is completed.

Figure 3:
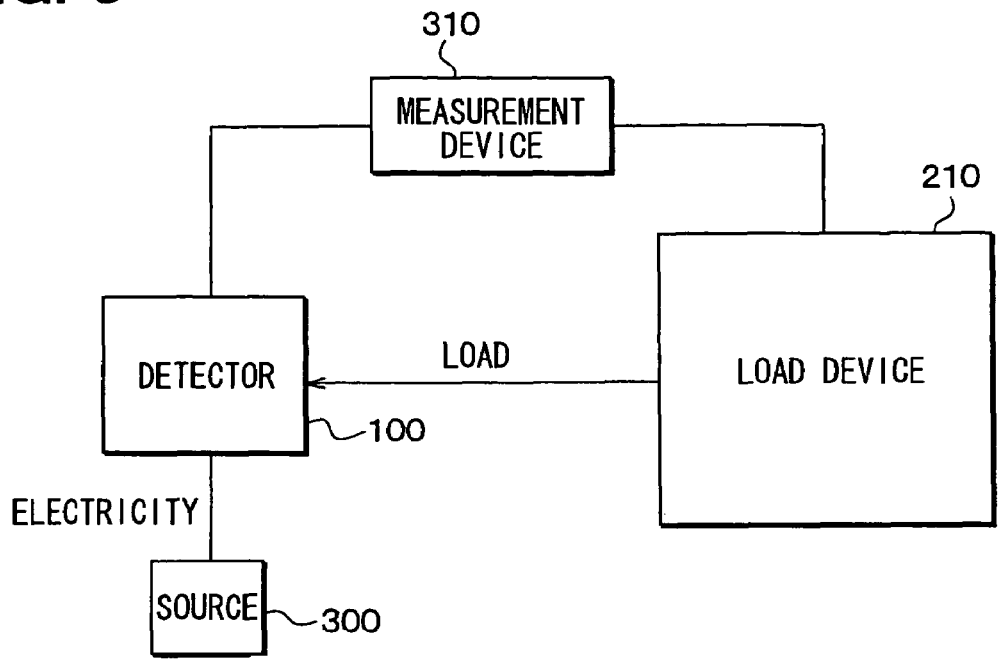
FIG. 3 is a schematic diagram showing welding equipment according to the preferred embodiment.

In this embodiment, a welding method for welding the first and the second members 1, 2 is different from a conventional method. FIG. 3 shows welding equipment used in the welding step of the first and the second members 1, 2.

When the stem 20 and the metallic casing 16 are welded, electric power is supplied to the terminal 61 of the detector 100 from electric power source 300 so that the electric power is supplied to the detection element 30. Therefore, the detection element 30 can detect the pressure, since the detection element 30 is energized.

The electric signal outputted from the detection element 30 is monitored by an output measurement device 310. The output measurement device 310 is, for example, a multi-purpose meter for measuring the output voltage as the electric signal from the detector 100. The output measurement device 310 connects to the terminal 61 of the detector 100.

The output measurement device 310 monitors the electric signal from the detection element 30. This monitored signal is inputted to a load application device 210 for a feedback control.

The load application device 210 includes a jig 200 so that the load application device 210 adds the load to the pressure receiving diaphragm 15 through the jig 200. The load application device 210 is controlled on the basis of the electric signal outputted from the output measurement device 310.

In a welding system according to this embodiment, the load application device 210 applies the load to the detection element 30 through the pressure transmission member 17 from the pressure receiving diaphragm 15. Under this load, the electric signal from the detection element 30 can be measured by the output measurement device 310. This measured electric signal is inputted into the load application device 210 for the feedback control. On the basis of the electric signal for the feedback control, the load application device 210 can control the load for applying the pressure receiving diaphragm 15.

Thus, the load for applying the detection element 30 through the pressure receiving diaphragm 15 is monitored as the electric signal from the detection element 30, and the load is determined on the basis of the monitored signal.

Thus, when the load applied to the detection element 30 becomes the target preliminary load for applying the detection element 30, the electric signal from the detection element 30 notifies an operator, a controller, or the system of a timing of the above point. Thus, the load application device 210 can apply the preliminary load to the detection element 30 accurately.

Under this preliminary load, the first and the second members 1, 2 are welded, i.e., the metallic stem 20 and the metallic casing 16 are welded. Here, they are welded by a laser beam welding method, a resistance welding method, or a plasma welding method. Preferably, they are welded by an all around welding method.

When the first and the second members 1, 2 are welded, firstly, the first and the second members 1, 2 are preliminary welded under the load determined on the basis of the electric signal from the detection element 30. After that, the first and the second members 1, 2 are welded again so that they are bonded together.

Figure 4:
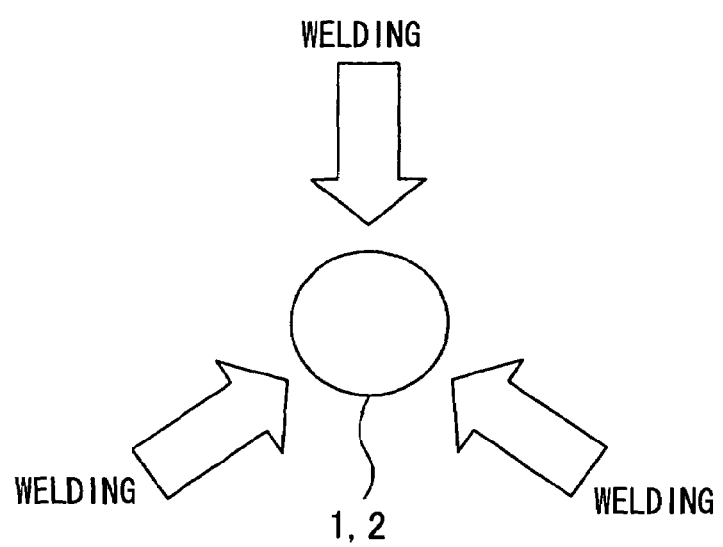
FIG. 4 is a top view explaining a preliminary welding step in a method for manufacturing the detector according to the preferred embodiment.

FIG. 4 shows the preliminary welding step. In this case, the metallic stem 20 and the metallic casing 16 are welded at multiple overlapped portions therebetween. Then, all overlapped portions between the stem 20 and the casing 16 are welded all around. Thus, they are completely welded.

During the preliminary welding step, the electric signal corresponding to the load detected from the detection element 30 may be monitored. Alternatively, when the load reaches the target preliminary load, the monitoring may be stopped, and then, the first and the second members 1, 2 are welded under the condition where the load is maintained by the load application device 210.

Thus, since the actual load applied to the detection element 30 is monitored on the basis of the electric signal outputted from the detection element 30, the actual load is obtained with high accuracy. Accordingly, the preliminary load is accurately set to be the target preliminary load.

Here, the first and the second members 1, 2 are welded. Specifically, after the first and the second members 1, 2 are preliminary welded, the first and the second members 1, 2 are welded all around. In this case, the first and the second members 1, 2 are preliminary welded so that the preliminary load applied to the detection element 30 is maintained substantially constant. Thus, the preliminary load is much accurately set to be the target preliminary load.

FIGS. 6A to 6D show a method for manufacturing a pressure device according to the preferred embodiment. In FIGS. 6A to 6D, the shape of the detector slightly different from the detector shown in FIG. 1. However, the characteristics of the method for manufacturing the detector in FIGS. 6A to 6D are the same as the method for manufacturing the detector in FIG. 1.

Figure 6A:
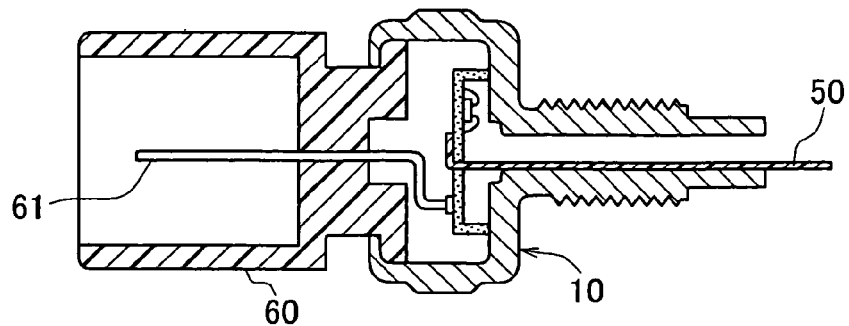
FIGS. 6A to 6D are cross sectional views explaining a method for manufacturing a pressure detector according to the preferred embodiment.
Figure 6B:
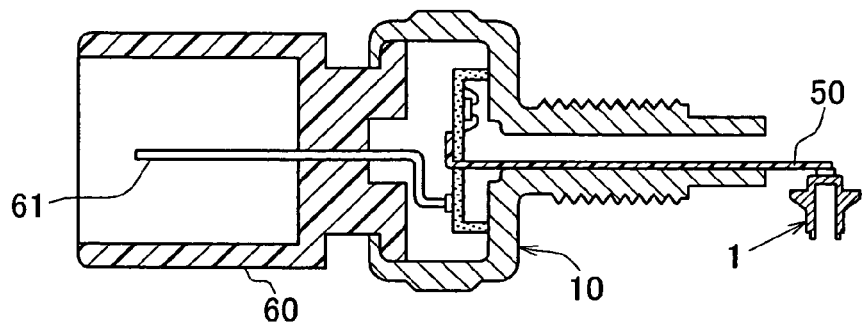
Figure 6C:
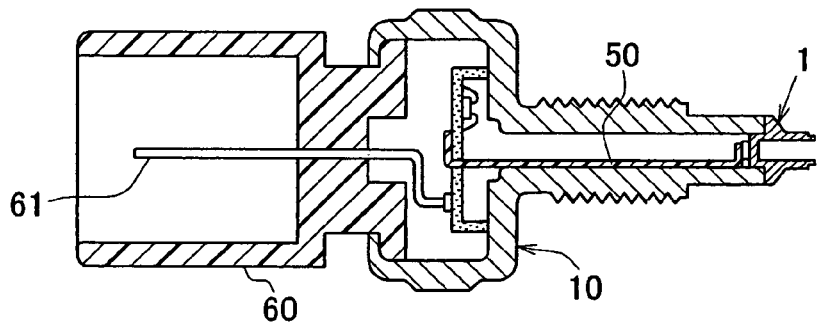
Figure 6D:
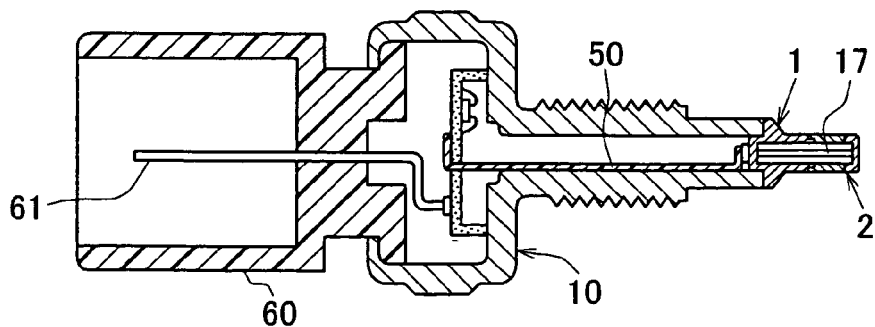

Firstly, as shown in FIG. 6A, the housing 10 and the connector casing 60 are crimped together. Then, as shown in FIG. 6B, the first member 1 is bonded to the flexible printed circuit board 50. Specifically, the detection element 30 is bonded to the flexible printed circuit board 50. Then, as shown in FIG. 6C, the first member 1 is inserted into the opening of the pipe portion 12. In this case, the first member 1, i.e., the metallic stem 20 and the pipe portion 12 are welded. Finally, the pressure transmission member 17 is inserted between the first and the second members 1, 2. Under the preliminary pressure, the first and the second members 1, 2 are welded. In this case, the preliminary pressure is monitored by the detection element 30. Here, the step of welding under the preliminary pressure is performed when the first and the second members are welded.

(Modifications)

Although the opening 21 of the metallic stem 20 and the metallic casing 16 of the second member 2 are welded, the metallic stem 20 and the pressure receiving diaphragm 15 may be directly welded. In this case, the detector 100 includes no metallic casing so that the length of the pressure transmission member 17 is shortened. Accordingly, the second member 2 includes only the pressure receiving diaphragm 15.

Alternatively, the housing 10 of the first member 1 and the metallic casing 16 or the pressure receiving diaphragm 15 of the second member 2 may be welded.

The detection element 30 and the circuit board 40 are connected with the flexible printed circuit board 50, since the distance between the detection element 30 and the circuit board 40 is large. Alternatively, they may be connected with other methods. For example, the length of the pressure transmission member 17 is lengthened so that the metallic stem 20 is positioned near the main body 11 of the housing 10. Then, the detection element 30 and the circuit board 40 are connected with a bonding wire. Further, the shape of the housing 10 may be changed so that the length of the pipe portion 12 is extremely shortened or the pipe portion 12 is removed. In this case, the distance between the detection element 30 and the circuit board 40 are shortened, so that they are connected with a bonding wire.

Although the housing 10 includes the main body 11 and the pipe portion 12, the shape of the housing 10 may be other shapes. Although the shape of the housing 10 is determined to be suitable for the combustion pressure sensor, the shape of the housing 10 may be determined appropriately to be suitable for other sensors.

Although the detection element 30 has a strain gauge function, the detection element 30 may have other functions as long as the detection element 30 outputs an electric signal corresponding to a detected pressure transmitted from the pressure transmission member 17.

The IC chip 42, the circuit board 40 and the like are disposed between the detection element 30 and the connector casing 60, other parts may be disposed between the detection element 30 and the connector casing 60.

Although the first and the second members 1, 2 are welded, the first and the second members 1, 2 may be connected by other methods such as a crimp method, a screw cramp method, and a brazing method.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for manufacturing a pressure detector comprising the steps of:
    preparing a first member including a stem and a sensing portion for outputting an electric signal corresponding to a pressure;
    preparing a second member including a pressure receiving diaphragm;
    preparing a pressure transmission member for transmitting the pressure received by the pressure receiving diaphragm to the sensing portion;
    arranging the pressure transmission member in a hollow portion of the stem;
    inserting the pressure transmission member in the stem between the sensing portion and the pressure receiving diaphragm;
    applying a preliminary load to the sensing portion through the pressure transmission member from the pressure receiving diaphragm;
    connecting the first member and the second member under the preliminary load;
    monitoring the electric signal outputted from the sensing portion, the electric signal corresponding to the preliminary load applied to the sensing portion; and
    determining the preliminary load on the basis of the electric signal monitored in the step of monitoring, wherein
    the stem includes a pressure transmission diaphragm,
    in the step of preparing the first member, the sensing portion is integrally bonded to the pressure transmission diaphragm in such a manner that the sensing portion is disposed outside of the hollow portion, and
    in the step of inserting the pressure transmission member in the stem, the first member is arranged on the second member.

2. The method according to claim 1, wherein
    in the step of connecting, the first member and the second member are welded.

3. The method according to claim 2, further comprising the step of:
    preliminary welding the first member and the second member under the preliminary load, wherein
    in the step of connecting, the first member and the second member are completely welded after the step of preliminary welding.

4. The method according to claim 3, wherein
    in the step of preliminary welding, the first member and the second member are welded at a plurality of overlapped portions between the first member and the second member, and
    in the step of connecting, the first member and the second member are welded all around.

5. The method according to claim 1, wherein
    in the step of allying the preliminary load, the preliminary load is applied with load application equipment, and
    in the step of monitoring the electric signal, the electric signal corresponding to the preliminary load applied with the load application equipment is inputted into the load application equipment so that the preliminary load is controlled with a feedback control method.

6. The method according to claim 5, wherein
    the step of connecting the first member and the second member is performed under the preliminary load, which is controlled with the feedback control method, and
    in the step of connecting, the first member and the second member are welded all around by a laser beam welding method, a resistance welding method or a plasma welding method.

7. The method according to claim 6, further comprising the step of:
    preliminary welding the first member and the second member under the preliminary load, wherein
    in the step of connecting, the first member and the second member are completely welded after the step of preliminary welding.

8. The method according to claim 1, further comprising the step of:
    preliminary welding the first member and the second member under the preliminary load, wherein
    in the step of preliminary welding, the first member and the second member are welded at a plurality of overlapped portions between the first member and the second member,
    in the step of connecting, the first member and the second member are completely welded all around after the step of preliminary welding,
    in the step of applying the preliminary load, the preliminary load is applied with load application equipment,
    in the step of monitoring the electric signal, the electric signal corresponding to the preliminary load applied with the load application equipment is inputted into the load application equipment so that the preliminary load is controlled with a feedback control method, and
    the step of connecting the first member and the second member is performed under the preliminary load, which is controlled with the feedback control method.

* * * * *